US006828538B2

(12) United States Patent
Maeda

(10) Patent No.: US 6,828,538 B2
(45) Date of Patent: Dec. 7, 2004

(54) ILLUMINATION DETECTION METHOD FOR LED PRINTBARS

(75) Inventor: Patrick Y. Maeda, Mountain View, CA (US)

(73) Assignee: Xerox Corporation, Stamford, CT (US)

(*) Notice: Subject to any disclaimer, the term of this patent is extended or adjusted under 35 U.S.C. 154(b) by 130 days.

(21) Appl. No.: 10/025,484

(22) Filed: Dec. 26, 2001

(65) Prior Publication Data
US 2003/0116694 A1 Jun. 26, 2003

(51) Int. Cl.[7] ................................................. G01J 1/32
(52) U.S. Cl. .................................. 250/205; 250/559.1
(58) Field of Search .............................. 250/205, 214 D, 250/559.1, 214 P; 358/504, 509; 347/246, 130, 225, 238; 346/107.1; 362/16, 18

(56) References Cited

U.S. PATENT DOCUMENTS

| 4,588,883 A | 5/1986 | Abbas ........................ 250/205 |
| 4,897,672 A | 1/1990 | Horiuchi et al. ............. 346/107 |
| 5,016,027 A | 5/1991 | Uebbing ...................... 346/107 |
| 5,917,534 A | 6/1999 | Rajeswaran .................. 347/238 |
| 6,075,233 A * | 6/2000 | Kato ........................... 250/205 |
| 2002/0134909 A1 * | 9/2002 | Shiota et al. ................ 250/205 |

FOREIGN PATENT DOCUMENTS

EP        0310266 A    4/1989

* cited by examiner

Primary Examiner—Que T. Le

(57) ABSTRACT

A system to monitor light emitting diodes (LEDs) in a printbar is described. The system integrates photodetectors into a printer or into the printbar itself such that as the printbar ages, the photodetectors can detect the decrease in intensity of the LEDs in the printbar and recalibrate driver circuits providing power to each LED. The recalibrated power output of each driver circuit compensates for non-uniformities in the LEDS that result from uneven aging of the LEDs.

15 Claims, 5 Drawing Sheets

LED Printbar with Illumination Detection

LED Printbar with Illumination Level Detection
Using Discrete Photodetectors (1 per LED Chip)

LED Printbar with Illumination Level Detection
Using a Strip Photodetector

LED Printbar with Illumination Detection

LED Printbar with Illumination Level Detection
Using Discrete Photodetectors (1 per LED Chip)

LED Printbar with Illumination Level Detection
Using Discrete Photodetectors (1 per 2 LED Chips)

ILLUMINATION DETECTION METHOD FOR LED PRINTBARS

BACKGROUND

Printbars are used in printer systems to optically expose regions on a photoreceptor on which a marking material, such as a toner, is to be deposited. Modern printers often use an array of Light Emitting Diodes (hereinafter LEDs) on a printbar to illuminate areas on which to deposit the toner. Each area illuminated by an LED corresponds to a "pixel" or "subpixel" of deposited toner. For an ideal printed image, these printed pixels or subpixels should be of uniform in size.

Pixel size and darkness is partially determined by the amount of light emitted by the LED corresponding to the pixel. In order to ensure uniformity of the printed pixels, it is important that each LED on a printbar outputs an intensity that is similar to other LEDs on the printbar. Thus, during assembly of the printbar, power sources providing power to the LEDs compensate for the non-uniformities between different LEDs in the printbar.

Almost immediately after being set in the factory, each LED in the printbar starts aging at a different rate. The different rates of aging and other changes to the LEDs and the drive systems results in a slow deterioration of printer output as non-uniformities in LED output increases in time. These nonuniformities produce uneven print results. When non-uniformities reach an unacceptable level, the printbar is replaced even though the LEDs in the printbar may have a substantial useful remaining life. Because of the high cost of printbars and the service personnel time used to replace the printbar, such replacements represent a significant waste of resources.

SUMMARY OF THE INVENTION

A system, incorporated into a printer, to monitor the LED printbar and automatically correct for deterioration of the LEDs is described. The system includes at least one detector integrated into the printbar to detect the output intensity of each LED in the printbar. Each LED output is compared to a reference output. When a LED output varies from the reference by more than a predetermined amount, a power supply or electrical driver that provides power to the LED is recalibrated to cause the LED to output the referenced intensity.

DETAILED DESCRIPTION OF THE DRAWINGS

Figure 1:
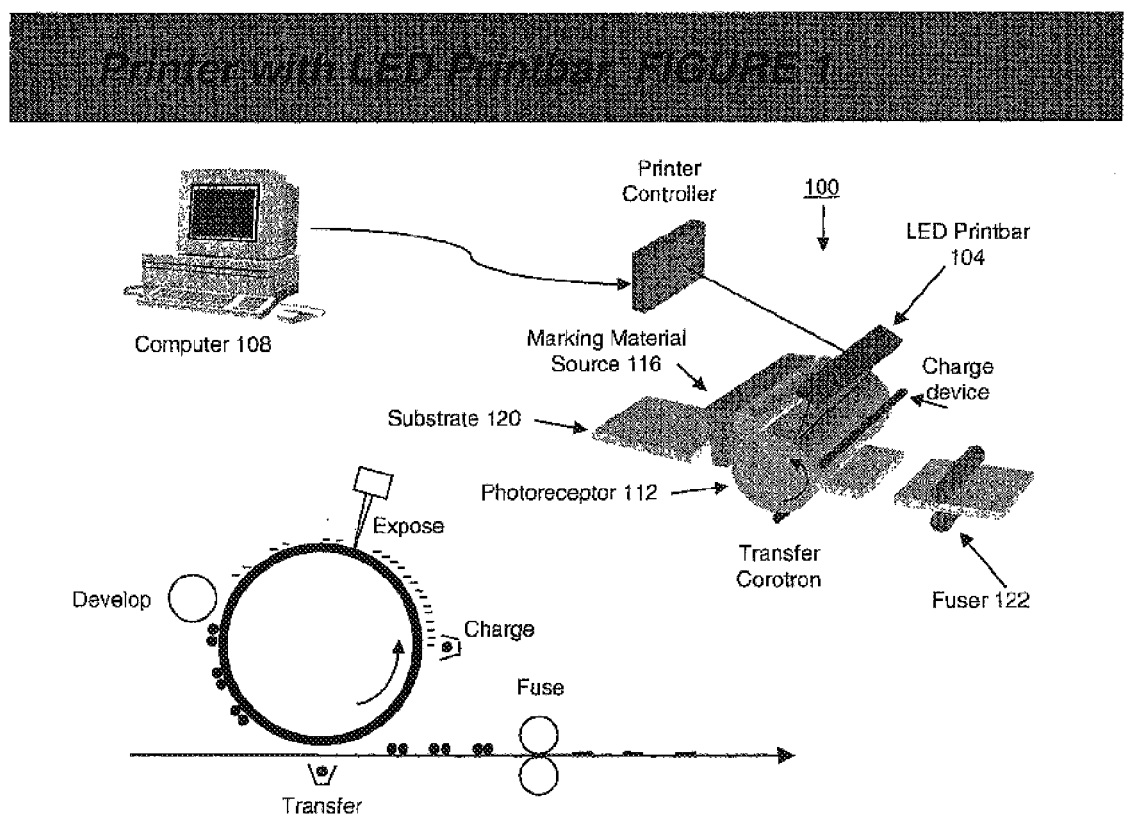
FIG. 1 shows a printer system including a printbar, and a system in the printer to monitor the output of the printbar.

FIG. 1 shows a printbar 104 as used in a printer system 100. The printbar receives a signal from a source of images, such as a computer 108. The printbar is positioned over a moving photoreceptor plane 112 that receives the light output of the printbar. The photoreceptor becomes discharged at each point where it receives light from a LED. The output of the LEDs is adjusted such that the light output of each LED corresponds to a pixel, or subpixel, and the combined output of LEDs in the printbar typically corresponds to a line of an image. As the photoreceptor moves relative to the printbar, a charge pattern is created on the photoreceptor that corresponds to the image to be printed.

Figure 2:
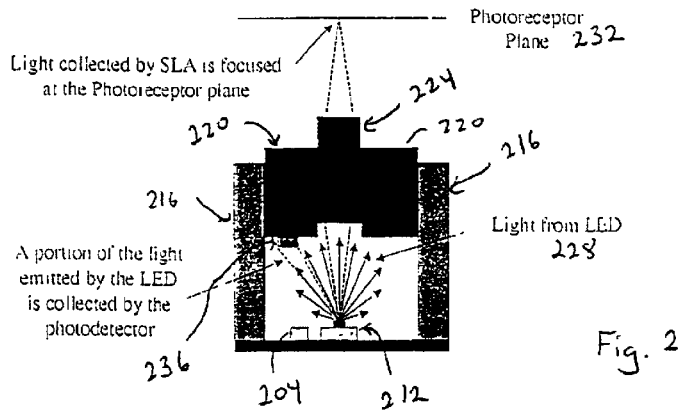
FIG. 2 shows one embodiment of a cross section of a LED printbar including an illumination detection mechanism.

After generation of a charge pattern on photoreceptor plane 112, a marking material source 116 deposits a marking material such as a toner over the photoreceptor drum, belt or plane 112. The marking material electrostatically adheres to the charged areas of photoreceptor plane 112 and matches the charge distribution to form an image. In some systems, an intermediate belt, drum, or roll accepts the developed marking material or toner image, and subsequently transfers the marking material to a substrate 120. A typical example of such a substrate is a sheet of paper. In alternate systems, the developed image on the photoreceptor is electrostatically transferred onto substrate 120. The marking material is then fused to substrate 120. When toner is used, the fusing may be done by using heat from a heat source 116 that melts the marking material causing adhesion of the marking material to substrate 120, FIG. 2 shows a cross section of one embodiment of printbar 104. A plurality of integrated circuit (IC) driver chips 204 mounted on a printed circuit board 208 controls the amount of power delivered to the plurality of LED chips 212. The power delivered controls the output of LED chips 212. A printbar housing 216 and printbar cover 220 support a lens array 224. Lens array 224 is typically a Selfoc Lens array (SLA) that images the light output 228 of LED chips 212 onto a photoreceptor in the photoreceptor plane 232. The charged photoreceptor is discharged according to the intensity of the light received from LED chips 21. Besides switching each LED on and off, driver circuits also control the individual drive current to each LED element. When initially fabricated, the drive current to each LED is adjusted to correct for non-uniform light output from different LEDs in the printbar. The non-uniform outputs typically result from slight differences in LED parameters that occur during the fabrication process. For example some LEDs may have slightly thicker active regions than other LEDs. Before correction, these non-uniformities typically result in a 20 to 30% variation in light intensity output among different LED chips at a given input current. Even when differences in process parameters are minimized by forming different LEDs on the same chip, the different LEDs within the same chip typically still have a 5 to 10% variation in light intensity at a given input current.

In printing applications, each LED typically corresponds to a pixel. The amount of toner deposited per pixel is a function of the light intensity output by the LED corresponding to the pixel. Relatively minor variation of even 2 to 10% in light output can result in a noticeable decline in print quality because the human eye is very sensitive to intensity differences over small distances.

To correct for these variations, each driver circuit is calibrated during assembly to compensate for the variations in LED light output at a given current. During final assembly on the production line, the output of each LED is measured at the SLA image plane. The output of the driver circuit is then adjusted to bring the light intensity output by each LED to a certain predetermined value within the illumination uniformity specification (typically within 1% to 2.5% of a desired intensity value). Thus a "calibration current" or "maximum current" refers to the amount of drive current for each LED that is used to achieve the correct illumination level. The calibration current is measured and stored.

During fabrication of the LED printbar (see FIG. 2A), the light that reaches a detector 236 when a corresponding LED receives a corresponding calibration current is measured and recorded. Detector 236 is typically a photodetector that outputs a detector current, the detector current being a function of the number of photons (light intensity) above a certain wavelength that reaches the photodetector. When the LED receives a calibration current that results in the LED outputting the desired intensity of light in the SLA image plane, the corresponding detector outputs a "maximum detector current." The value of the maximum detector current for the particular LED is stored in memory. The stored value will be used as a reference for future recalibration of the LED in the field.

When printing an image with different shades of gray, each LED adjusts its intensity to correspond to the different gray levels of a pixel being printed. The adjustment in intensity is achieved by scaling the driver circuit current provided to the LED. The actual current received by the LED when printing a pixel is thus a scaling of the calibrated current. For example, when a pixel darkness is 50% of the darkest printed pixel, a scaling factor of 50% is multiplied to the calibrated current corresponding to the LED. The scaling factor is typically the same for all LEDs, in most printing applications only the calibration current which was set at the factory, differs from pixel to pixel.

As the printbar undergoes thermal changes and ages, the LED output at a given driver current usually declines. The rate of decline of different LEDs in the printbar is not uniform. In traditional systems, when the differing rates of decline result in output intensity differences between adjacent LEDs exceeding acceptable specifications, the LED printbar is replaced even though the LEDs may still have a significant period of useful life. A LED printbar can range in price from $100 to $2,000, thus replacing a LED printbar with significant potential remaining life wastes significant resources. The invention avoids such replacement by periodically recalibrating the printbar using the stored photodetector outputs. The recalibration process using the photodetector is described in the flow chart and description accompanying FIG. 8.

Figure 3:
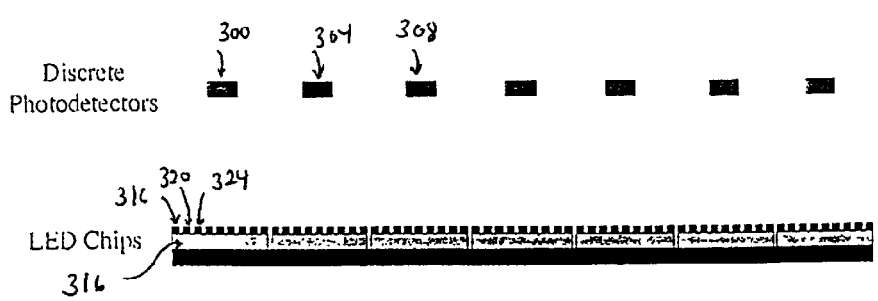
FIG. 3 shows an arrangement where each photodetector corresponds to a LED chip including multiple LEDs.

Although FIG. 2 shows a single detector 236 corresponding to each LED, in order to save on fabrication costs, it is possible to implement the system of the present invention using fewer discrete photodetectors. FIG. 3 shows using a discrete photodetectors 300, 304, 308, each photodetector corresponding to a LED chip such as LED chip 312 which corresponds to photodetector 300. Each LED chip such as LED chip 312 includes a plurality of LEDs such as LED 316, 320, 324.

Alternate embodiments may be implemented that use one discrete photodetector for every two or more LED chips. However, reducing the number of discrete detectors increases the solid angle from which light will be received from associated LEDs because the LEDs will be spread over a wider area. The radiation pattern output by each LED may not be uniform in different directions, thus LEDs directly under the detector may provide more accurate reading relating to the decrease in output in the photoreceptor plane then LEDs located a significant distance off axis of the detector. Thus, the number of photodetectors should be kept sufficient such that the detection of LED output occurs over a reasonable dynamic range.

Figure 4:
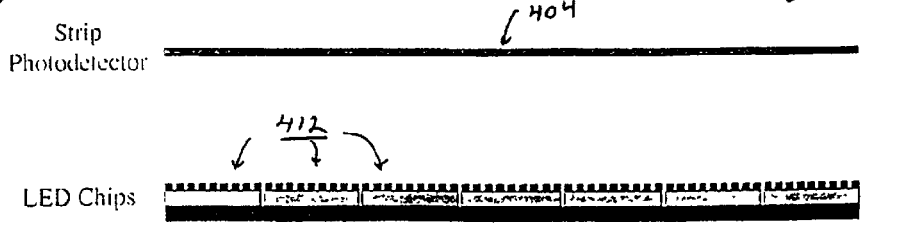
FIG. 4 shows an arrangement where a single strip photodetector is used in place of multiple discrete photodetectors.

One method of avoiding the problem of discrete photodetectors located significantly off axis from the LED being detected is to utilize a strip photodetector as shown in FIG. 4. In FIG. 4, a strip photodetector 404 runs along the printbar 408 parallel to the series of LEDs. The output of each LED can then be individually measured by keeping all LEDs off and switching only one LED on at a particular point in time. The output of strip photodetector 404 is then measured with the only one LED on.

Although, FIG. 2 shows photodetector 236 mounted directly to the cover of the printbar, alternate locations for the photodetector are also possible. The position on the cover is ideal for receiving light from the LED, however, fabrication may be simplified by mounting the detector on the circuit board as shown in FIG. 5, mounting the detector to the inside of the housing or mounting the detector to another, preferably interior, surface of the printbar.

Figure 5:
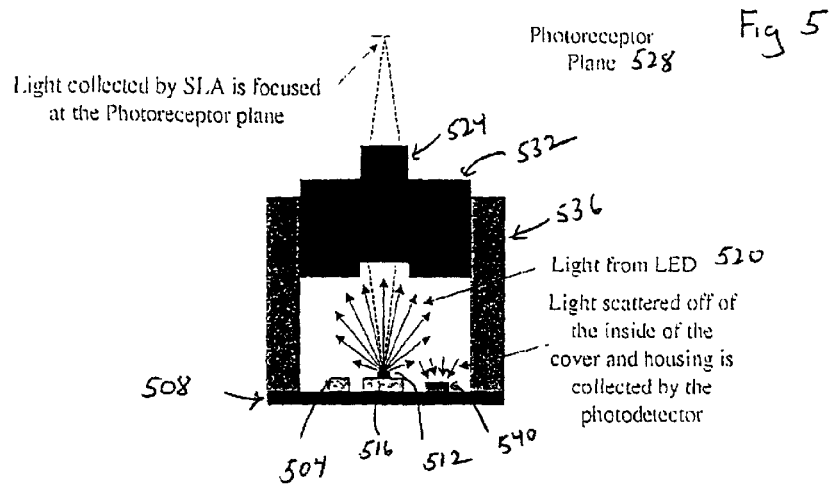
FIG. 5 shows an arrangement where the photodetector is mounted on a circuit board upon which the LED is mounted.

In FIG. 5, a driver circuit 504 mounted on printed circuit board 508 provides power to a LED 512 on LED chip 516. Light 520 output from LED 512 is focused by a lens array 524 onto a photoreceptor plane 528. However, significant light is also reflected from printbar cover 532 as well as printbar housing 536. The reflected light is detected by a photodetector 540 mounted on printed circuit board 508.

Figure 6:
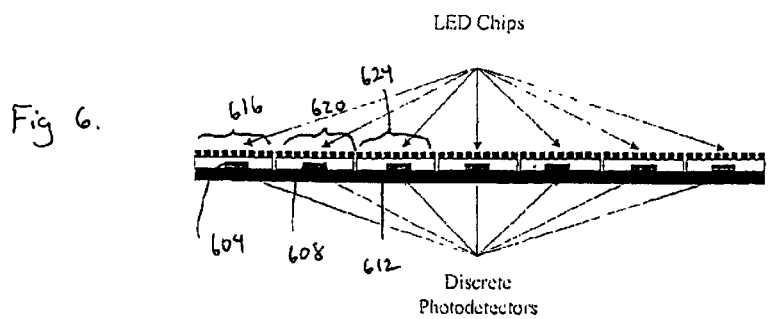
FIG. 6 shows the use of multiple photodetectors mounted as illustrated in FIG. 5.
Figure 7:
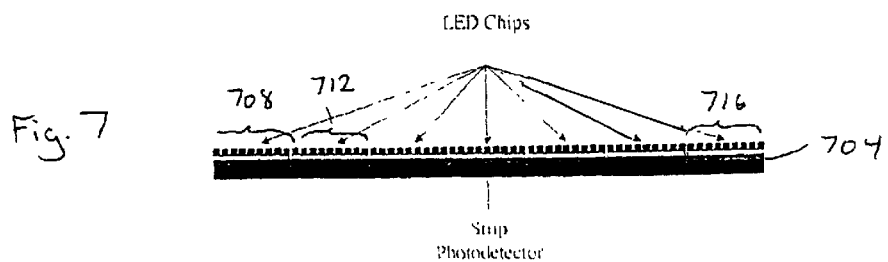
FIG. 7 shows the use of a single strip photodetector mounted on a circuit board upon which the LED is mounted.

FIG. 6 shows the use of a plurality of discrete photodetectors 604, 608, 612 mounted on a printed circuit board adjacent to LED chips 616, 620, 624. As in the case of the photodetectors mounted on the cover of the printbar, the number of photodetectors may be reduced such that a single discrete photodetector can correspond to several LED chips. However, due to the detection of reflected light rather than direct LED output, the location of the detectors is preferably not too far from the LED. Alternately, as shown in FIG. 7, a single strip photodetector 704 running parallel to a series of LED chips 708, 712, 716 can be used to detect the output of the LED chips.

Figure 8:
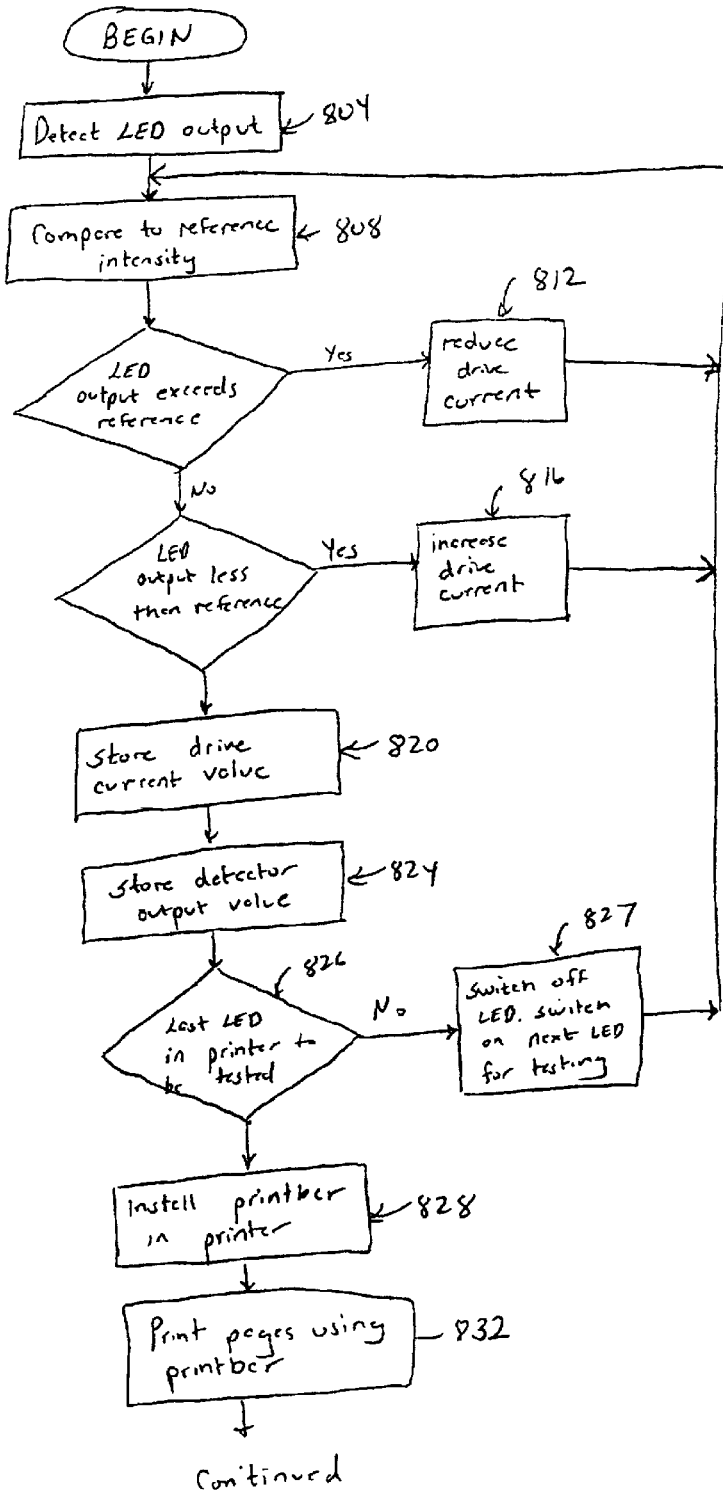
FIG. 8 is a flow chart that describes that describes the method of detecting and adjusting power in a LED printbar.
Figure 8:
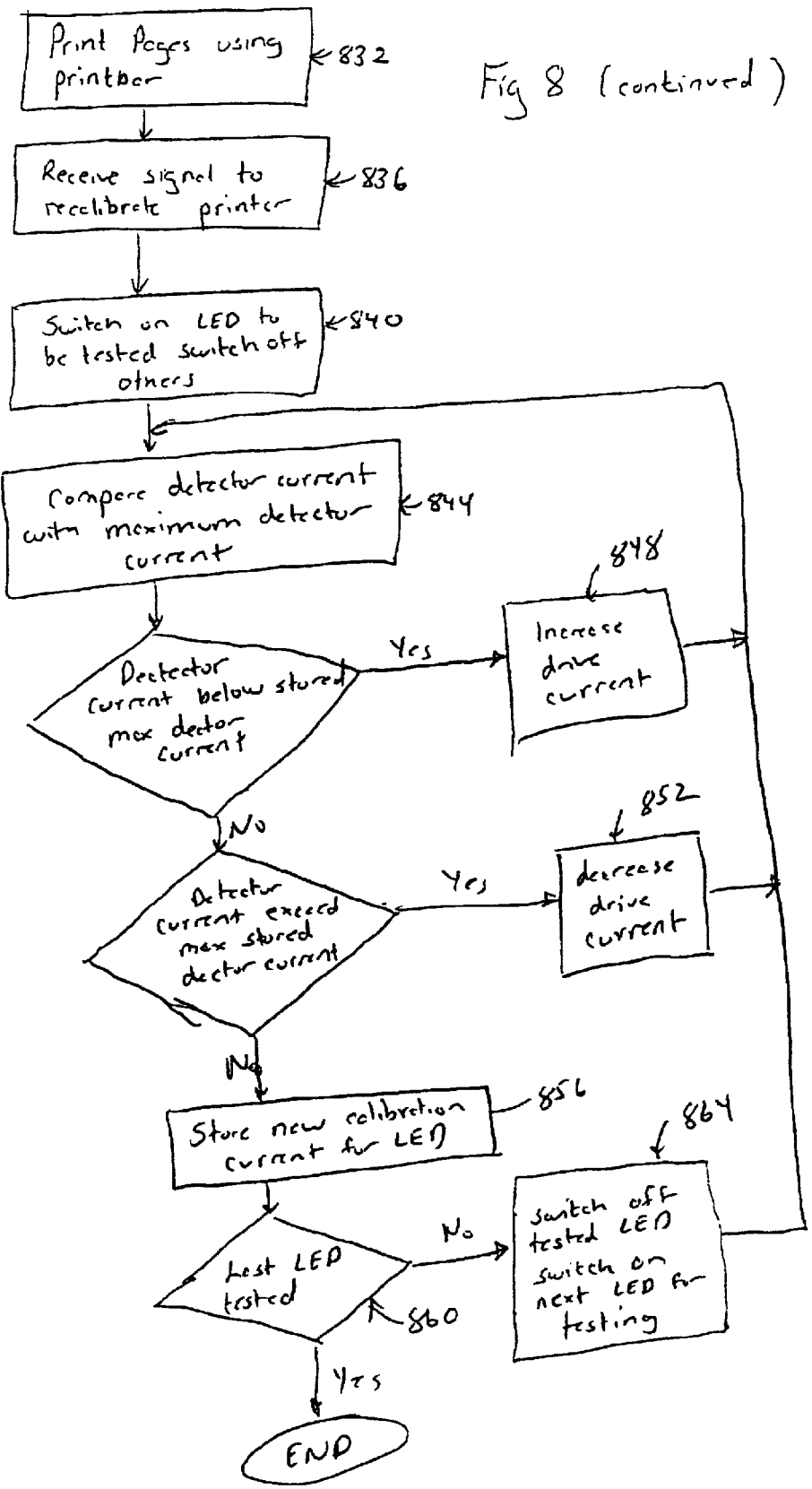

FIG. 8 is a flow chart that shows the procedures used to readjust the calibration current provided to the LEDs after the printbar has been in use for a period of time. Blocks 800–828 of the flowchart correspond to the initial set up of the system, usually including assembly of the printbar and installation of the printbar in a printer. Blocks 832–864 of the flowchart correspond to operation of the printer and recalibration of the printbar after a period of printing.

During assembly of the printbar, the light output from a LED is detected at a photoreceptor plane in block 804. The light intensity output from the LED is compared to a desired reference light intensity in block 808. The reference light intensity is typically determined by the sensitivity of the photoreceptor and is a characteristic of the printer. The reference light intensity is typically the same for all LEDs on the printbar.

When the light intensity output by the LED exceeds the reference light intensity, a corresponding driver circuit reduces the current provided to the LED in block 812. If the light output by the LED is less then the reference light intensity, the driver circuit increases the current provided to the LED in block 816. When the light output by the LED is within a specified tolerance of the reference light intensity at the photoreceptor, the calibration current provided by the driver circuit to achieve the reference light intensity is stored in a memory location in block 820 for future reference. The driver current stored in the memory location is the "maximum driver current" or "calibration current" provided by the driver circuit to the LED. In block 824, the output of a photodetector, typically a "maximum detector current" or "detector match current" is also stored. The maximum detector current is the output of the photodetector when the LED outputs the reference light intensity at the photoreceptor plane. In block 826, the testing equipment determines whether the last LED in the printbar has been tested. If the LED is not the last LED being calibrated, the LED that was immediately tested is turned off and the next LED to be calibrated is switched on in block 827. The calibration procedure is then repeated for the new LED under test.

In block 828, the printbar is installed inside the printer. The printbar is subject to normal use in block 832. Such normal use may include, but is not limited to receiving a signal from an imaging source such as a computer and causing the printbar to illuminate a media such that a charge distribution on the media matches the image from the imaging source. The charge distribution distributes a marking material over the media such that the marking material distribution matches the image from the imaging source.

After a period of printing, a signal is transmitted to recalibrate the printbar in block 836. Such a signal may be generated upon each power up of the printbar, or more typically, the signal may be generated after an extended period of printing. When a signal to recalibrate the printbar is received, a routine to redetermine the maximum LED current or calibration current of the LEDs in the printbar is initiated.

In block 840, only one LED is switched on and all remaining LEDs are switched off Current is provided to the only one LED and a comparison circuit compares the output of photodetector with the detector match current stored in memory in block 844. Typically, an ideal starting current is the calibration current for the LED, typically this calibration current was determined during printbar assembly or the last recalibration of the printbar. When the output of the photodetector is below the stored maximum detector current for the LED being tested, the drive circuit increases the current to the LED in block 848 to increase the LED output. When the comparison circuit determines that the output of the photodetector exceeds the detector match current stored in memory, the driver circuit decreases the drive current to the LED in block 852. When the comparison circuit determines that the output of the photodetector matches the stored maximum detector current value within a specified tolerance, the output of the LED is assumed to approximately be the reference or ideal LED output within the specified tolerance. The drive current used to achieve the output is stored as the new calibration current for the LED. In block 856, the new calibration current value replaces the calibration current value stored in memory.

The process of recalibration is repeated for each LED in the printbar. Thus, in block 860, it is determined whether the LED tested is the last LED in the printbar. When it is not the last LED to be tested, the LED is turned off, and the next LED to be tested in the printbar is turned on in box 864. The procedure beginning with box 844 is then repeated with a corresponding photodetector for the next LED to be tested. The procedure continues until every LED in the printbar has been tested. In the event that regardless of drive current, a LED in the printbar is unable to output sufficient light intensity to cause the photodetector to output the maximum detector current corresponding to the LED, a warning may be provided to the user that the printbar should be replaced.

Although for clarity and ease of description, the preceding discussion describes testing each LED individually, it should be understood that the same procedures can be applied to testing groups of LEDs instead of each LED individually. Calibrating LEDs individually provides the most accurate results for uniformity of pixels across the image. However, such individual testing may be too time consuming or too expensive, or inaccurate. For example, LED quality may be variable such that it is too expensive to assure that every LED is capable of producing a predetermined intensity. Another problem is that sometimes the number of photons output by a single LED is inadequate for proper statistical averaging by a photodetector. Under such conditions, calibrating groups of closely located LEDs together as a group may be useful Such group testing may be conducted by following the procedures outlined in FIG. 8, however, instead of switching all LEDs off except for one LED, all LEDs are switched off except for the LEDs in the group being tested. Adjustments in drive current are made to all LEDs in the group of LEDs to reach the desired intensity for the group.

In order to facilitate understanding of the invention, a number of details have been provided. For example, various positioning of the intensity detectors, and even example materials that may be used to fabricate the intensity detectors have been recited. These details are provided to facilitate an understanding of the invention and to provide example embodiments, but are not intended to limit the scope of the invention which should only be limited by the claims as given below.

What is claimed is:

1. A method of calibrating a printbar in a printer comprising the operations of:

utilizing a printbar to output an image;

receiving a signal to recalibrate the printbar; and detecting at a photodetector integrated into said printer, the output of a Light emitting diode on the printbar and adjusting a current provided to the Light emitting diode until the intensity of light detected by the photodetector matches a reference intensity determined during assembly of the printbar; and, replacing a reference current value stored in memory with a revised reference current value, the revised reference current value indicating the new current provided to the light emitting diode that causes the intensity of light detected by the photodetector to match the reference intensity determined during assembly of the printbar.

2. The method of claim 1 wherein over 50% of the light detected by the photodetector is light from the LED after being reflected or scattered from one or more surfaces of the printbar.

3. The method of claim 1 wherein the photodetector is a single strip photodetector running a length of the printbar.

4. The method of claim 1 further comprising the operation of:

detecting at a second photodetector integrated into said printer, the output of a second Light emitting diode on the printbar and adjusting a current provided to the second Light emitting diode until the intensity of light detected by the second photodetector matches a reference intensity determined during assembly of the printbar.

5. The method of claim 1 further comprising the operation of:

detecting at a photodetector integrated into said printer, an output of a second Light emitting diode on the printbar and adjusting a current provided to the second Light emitting diode until the intensity of light detected by the photodetector matches a second reference intensity determined during assembly of the printbar.

6. The method of claim 1 wherein the operation of detecting at a photodetector the output of a light emitting diode on the printbar end comparing the output to a corresponding reference intensity is repeated for every light emitting diode on the printbar.

7. A method of calibrating a printbar in a printer comprising the operations of:

utilizing a printbar to output an image;

receiving a signal to recalibrate the printbar;

detecting at a photodetector Integrated into said printer, the output of a group of light emitting diodes on the printbar and adjusting a current provided to the group of Light emitting diodes until the intensity of light detected by the photodetector matches a reference intensity determined during assembly of the printbar; and, replacing a reference current value stored in memory with a revised reference current value, the revised reference current value indicating the new current provided to the group of light emitting diodes that causes the intensity of light detected by the photodetector to match the reference intensity determined during assembly of the printbar.

8. The method of claim 7 wherein over 50% of the light detected by the photodetector is light from the group of light emitting diodes after being reflected or scattered from one or more surfaces of the printbar.

9. The method of claim 7 wherein the photodetector is a single strip photodetector running a length of the printbar.

10. The method of claim 7 further comprising the operation of:

detecting at a second photodetector integrated into said printer, the output of a second group of Light emitting diode on the printbar and adjusting a current provided to the second group of Light emitting diode until the intensity of light detected by the second photodetector matches a reference intensity determined during assembly of the printbar.

11. The method of claim 7 further comprising the operation of:

detecting at a photodetector integrated into said printer, the output of a second group of Light emitting diodes or, the printbar and adjusting a current provided to the second group or Light emitting diodes until the intensity of light detected by the photodetector matches a reference intensity determined during assembly of the printbar.

12. A method of calibrating a printbar in a printer comprising the operations of:

switching on one light emitting diode and switching all other light emitting diodes off;

detecting using a detector the output of the one light emitting diode;

comparing the detected output of the detector with a stored value, the stored value corresponding to a previous output of the detector measured during assembly of the printbar; and adjusting the power supplied to the one light emitting diode until the output of the detector matches the stored value; and, further comprising the operation of storing the amount of power supplied to the one light emitting diode when the output of the detector matches the stored value.

13. The method of claim 12 further comprising the operation of repeating the detecting and comparing operations for a second light emitting diode on the printbar.

14. A method of calibrating a printbar in a printer comprising the operations:

switching on a group of light emitting diodes and switching ail other light emitting diodes off;

detecting using a detector the output of the group of light emitting diodes;

comparing the detected output of the detector with a stored value, the stored value corresponding to a previous output of the detector measured during assembly of the printbar; and adjusting the power supplied to the group of light emitting diodes until the output of the detector matches the stored value; and, storing the amount of power supplied to the group of diodes when the output of the detector matches the stored value.

15. The method of claim 14 wherein the stored value measured during assembly of the printbar was determined by using the detector to measure the output of the group of light emitting diodes during assembly of the printer.

* * * * *